United States Patent
Zhang et al.

(10) Patent No.: US 11,522,611 B1
(45) Date of Patent: Dec. 6, 2022

(54) DISTRIBUTED ANTENNA SYSTEM AND COMMUNICATION SYSTEM

(71) Applicant: PROSE Technologies Co., Ltd., Jiangsu (CN)

(72) Inventors: Rui Zhang, Jiangsu (CN); Haijun Min, Jiangsu (CN)

(73) Assignee: PROSE Technologies Co., Ltd., Suzhou (CN)

( * ) Notice: Subject to any disclaimer, the term of this patent is extended or adjusted under 35 U.S.C. 154(b) by 0 days.

(21) Appl. No.: 17/750,310

(22) Filed: May 21, 2022

(30) Foreign Application Priority Data

Dec. 27, 2021 (CN) .......................... 202123300973.1

(51) Int. Cl.
*H04B 10/2575* (2013.01)
*H04B 7/022* (2017.01)

(52) U.S. Cl.
CPC ....... *H04B 10/25753* (2013.01); *H04B 7/022* (2013.01); *H04B 10/25759* (2013.01); *H04B 2210/006* (2013.01)

(58) Field of Classification Search
None
See application file for complete search history.

(56) References Cited

U.S. PATENT DOCUMENTS

| | | | | |
|---|---|---|---|---|
| 2011/0135308 A1* | 6/2011 | Tarlazzi | ............... | H04B 7/0413 398/118 |
| 2011/0223958 A1* | 9/2011 | Chen | ................. | H04W 72/0473 455/522 |
| 2014/0050212 A1* | 2/2014 | Braz | ...................... | H04B 1/005 370/343 |
| 2014/0355991 A1* | 12/2014 | Cameirao | .......... | H04B 10/2575 398/79 |
| 2015/0229397 A1* | 8/2015 | Shibata | ............ | H04B 10/25754 398/115 |
| 2017/0034716 A1* | 2/2017 | Dortschy | ............... | H04W 24/06 |
| 2019/0181940 A1* | 6/2019 | Liang | ................... | H04L 5/0023 |

* cited by examiner

*Primary Examiner* — Darren E Wolf
(74) *Attorney, Agent, or Firm* — King & Wood Mallesons (57) ABSTRACT

A distributed antenna system comprises a first access unit and a remote unit, wherein the first access unit and the remote unit are coupled via an analog optical fiber, and the first access unit comprises: a first port configured to receive a first downlink analog radio frequency signal; a first analog-to-digital conversion unit configured to perform analog-to-digital conversion on the first downlink analog radio frequency signal to generate a first downlink digital signal; a first digital processing unit configured to perform digital signal processing on the first downlink digital signal to generate a second downlink digital signal; a first digital-to-analog conversion unit configured to perform digital-to-analog conversion on the second downlink digital signal to generate a second downlink analog radio frequency signal; and an analog optical module configured to perform electro-optical conversion on the second downlink analog radio frequency signal to generate a first downlink analog optical signal.

18 Claims, 6 Drawing Sheets

DISTRIBUTED ANTENNA SYSTEM AND COMMUNICATION SYSTEM

FIELD

Embodiments of the present disclosure generally relate to the field of communications, and specifically to a distributed antenna system and communication system.

BACKGROUND

With the development of wireless communication technology (especially 5G communication technology), demands for data services in wireless network applications have increased dramatically, and the signal spectrum bandwidth has increased. A traditional distributed antenna system based on digital optical fibers is faced with a difficulty in the requirements for large-bandwidth data transmission.

SUMMARY

Embodiments of the present disclosure provide a distributed antenna system and a communication system, which can achieve large-bandwidth data transmission.

According to a first aspect of the present disclosure, there is provided a distributed antenna system. The distributed antenna system comprises: a first access unit and a remote unit, wherein the first access unit and the remote unit are coupled to each other via an analog optical fiber, and the first access unit comprises: a first port configured to receive a first downlink analog radio frequency signal from a first base station; a first analog-to-digital conversion unit coupled to the first port and configured to perform analog-to-digital conversion on the first downlink analog radio frequency signal to generate a first downlink digital signal; a first digital processing unit coupled to the first analog-to-digital conversion unit and configured to perform digital signal processing on the first downlink digital signal to generate a second downlink digital signal; a first digital-to-analog conversion unit coupled to the first digital processing unit and configured to perform digital-to-analog conversion on the second downlink digital signal to generate a second downlink analog radio frequency signal; and an analog optical module coupled to the first digital-to-analog conversion unit and configured to perform electro-optical conversion on the second downlink analog radio frequency signal to generate a first downlink analog optical signal which is transmitted to the remote unit via the analog optical fiber.

In some embodiments, the analog optical module is further configured to receive an uplink analog optical signal from the remote unit, and convert the uplink analog optical signal into a first uplink analog radio frequency signal, and the first access unit further comprises: a second analog-to-digital conversion unit coupled to the analog optical module and configured to perform analog-to-digital conversion on the first uplink analog radio frequency signal to generate a first uplink digital signal; the first digital processing unit is further coupled to the second analog-to-digital conversion unit and configured to perform digital signal processing on the first uplink digital signal to generate a second uplink digital signal; and a second digital-to-analog conversion unit coupled to the first digital processing unit and the first port and configured to perform digital-to-analog conversion on the second uplink digital signal to generate a second uplink analog radio frequency signal which is transmitted to the first base station via the first port.

In some embodiments, the first access unit further comprises a first digital optical module coupled to the first digital processing unit, and the distributed antenna system further comprises a second access unit, the second access unit comprises: a second port configured to receive a third downlink analog radio frequency signal from the second base station; a third analog-to-digital conversion unit coupled to the second port and configured to perform analog-digital conversion on the third downlink analog radio frequency signal to generate a third downlink digital signal; a second digital processing unit coupled to the third analog-to-digital conversion unit and configured to perform digital signal processing on the third downlink digital signal to generate a fourth downlink digital signal; a second digital optical module coupled to the second digital processing unit and coupled to the first digital optical module via a digital optical fiber and configured to perform electro-optical conversion on the fourth downlink digital signal to generate a downlink digital optical signal which is transmitted to the first digital optical module via the digital optical fiber.

In some embodiments, the first digital optical module is configured to perform photoelectric conversion on the downlink digital optical signal to generate a fifth downlink digital signal; the first digital processing unit is further configured to perform digital signal processing on the first downlink digital signal and the fifth downlink digital signal to generate a second downlink digital signal.

In some embodiments, the first digital optical module is further configured to perform electro-optical conversion on the second uplink digital signal to generate an uplink digital optical signal, the second digital optical module is further configured to perform photoelectric conversion on the uplink digital optical signal to generate a third uplink digital signal, the second digital processing unit is further configured to perform digital signal processing on the third uplink digital signal to generate a fourth uplink digital signal, and the second access unit further comprises: a third digital-to-analog conversion unit coupled to the second digital processing unit and configured to perform digital-to-analog conversion on the fourth uplink digital signal to generate a third uplink analog radio frequency signal which is transmitted to the second base station via the second port.

In some embodiments, there are a plurality of remote units, and the distributed antenna system further comprises a network extension unit coupled between the first access unit and the plurality of remote units via the analog optical fiber.

In some embodiments, there are a plurality of the first ports, a plurality of the first base stations, a plurality of the first downlink analog radio frequency signals, a plurality of the second downlink analog radio frequency signals, a plurality of the first analog-to-digital conversion units and a plurality of the first digital-to-analog conversion units, and the first access unit further comprises: a combining unit coupled between the plurality of first digital-to-analog conversion units and the analog optical modules and configured to combine the plurality of second downlink analog radio frequency signals to generate a combined downlink analog radio frequency signal; and the analog optical module further configured to perform electro-optical conversion on the combined downlink analog radio frequency signal to generate a first downlink analog optical signal which is transmitted to the remote unit via the analog optical fiber.

In some embodiments, there are a plurality of second analog-to-digital conversion units and a plurality of second digital-to-analog conversion units, and the first access unit further comprises: a splitting unit coupled to the plurality of second analog-to-digital conversion units and the analog optical module and configured to split the first uplink analog radio frequency signal to generate a plurality of split uplink analog radio frequency signals; and the plurality of second analog-to-digital conversion units are configured to perform analog-to-digital conversion on the plurality of split uplink analog radio frequency signals to generate a plurality of first uplink digital signals.

In some embodiments, the distributed antenna system further comprises: a plurality of splitting and combining units, each of the plurality of splitting and combining units is coupled between the plurality of first base stations and the corresponding first ports, each splitting and combining unit is configured to combine a plurality of downlink analog radio frequency signals having the same frequency band from the plurality of first base stations to generate a first downlink analog radio frequency signal to output to a corresponding first port, and each splitting and combining unit is further configured to split the second uplink analog radio frequency signal from the corresponding first port to output to the plurality of first base stations.

In some embodiments, the plurality of first downlink analog radio frequency signals have at least one of the following: one or more network standards, one or more network frequency bands, and one or more service types.

In some embodiments, the first digital processing unit is further configured to perform at least one of digital filtering and digital power balancing performed on the first downlink digital signal to generate the second downlink digital signal.

According to a second aspect of the present disclosure, there is provided a communication system, wherein the communication system comprises: one or more base stations; and the distributed antenna system according to the first aspect, the distributed antenna system coupled to one or more base stations.

According to the embodiment of the present disclosure, the access unit performs analog-to-digital conversion, digital processing, digital-to-analog conversion, and electro-optical conversion on the analog radio frequency signal, and then transmits it to the remote, which can achieve large-bandwidth data transmission.

It should be appreciated that this Summary is not intended to identify key features or essential features of the claimed subject matter, nor is it intended to be used to limit the scope of the claimed subject matter. Other features of the present disclosure will become more apparent from the following description.

BRIEF DESCRIPTION OF THE DRAWINGS

The above and other features, advantages and aspects of embodiments of the present disclosure will become more apparent from the following detailed description with reference to the accompanying drawings, in which the same reference symbols refer to the same elements.

DETAILED DESCRIPTION OF EMBODIMENTS

Exemplary embodiments of the present disclosure are described below with reference to the accompanying drawings, and include various details of the embodiments of the present disclosure to facilitate understanding and should be considered as exemplary only. Accordingly, those having ordinary skill in the art will recognize that various changes and modifications of the embodiments described herein can be made without departing from the scope and spirit of the present disclosure. Furthermore, depictions of well-known functions and constructions are omitted from the following depictions for purpose of clarity and conciseness.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The term "unit", "module" and "port" include circuit/circuits. The following text may also contain other explicit or implicit definitions.

As mentioned above, the traditional distributed antenna system based on digital optical fibers is confronted with the problem of large-bandwidth data transmission, and the hardware cost of remote transmission increases sharply. In addition, the traditional distributed antenna system is also confronted with the problem of multi-operator and multi-service access such as compatibility with 2G, 3G, 4G and 5G. The loss in the transmission of signals at different frequencies varies greatly. It is difficult for the traditional distributed antenna system cannot to meet the requirements of simultaneous access to multiple wireless communication networks, such as interference between multi-base station and multi-standard signals, and power balance between multi-base station and multi-standard signals.

To at least partially address one or more of the above-mentioned problems and other potential problems, example embodiments of the present disclosure propose a distributed antenna system. The distributed antenna system comprises: a first access unit and a remote unit, the first access unit and the remote unit coupled to each other via an analog optical fiber, the first access unit comprising: a first port configured to receive a first downlink analog radio frequency signal from a first base station; a first analog-to-digital conversion unit coupled to the first port and configured to perform analog-to-digital conversion on the first downlink analog radio frequency signal to generate a first downlink digital signal; a first digital processing unit coupled to the first analog-to-digital conversion unit and configured to perform digital signal processing on the first downlink digital signal to generate a second downlink digital signal; a first digital-to-analog conversion unit coupled to the first digital processing unit and configured to perform digital-to-analog conversion on the second downlink digital signal to generate a second downlink analog radio frequency signal; and an analog optical module coupled to the first digital-to-analog conversion unit and configured to perform electro-optical conversion on the second downlink analog radio frequency signal to generate a first downlink analog optical signal which is transmitted to the remote unit via the analog optical fiber. According to the embodiment of the present disclosure, the access unit performs analog-to-digital conversion, digital processing, digital-to-analog conversion, and electro-optical conversion on the analog radio frequency signal, and then transmits the converted signal to the remote unit through the analog optical fiber, which can realize large-bandwidth data transmission.

Hereinafter, specific examples of the present solution will be described in more detail with reference to the accompanying drawings.

Figure 1:
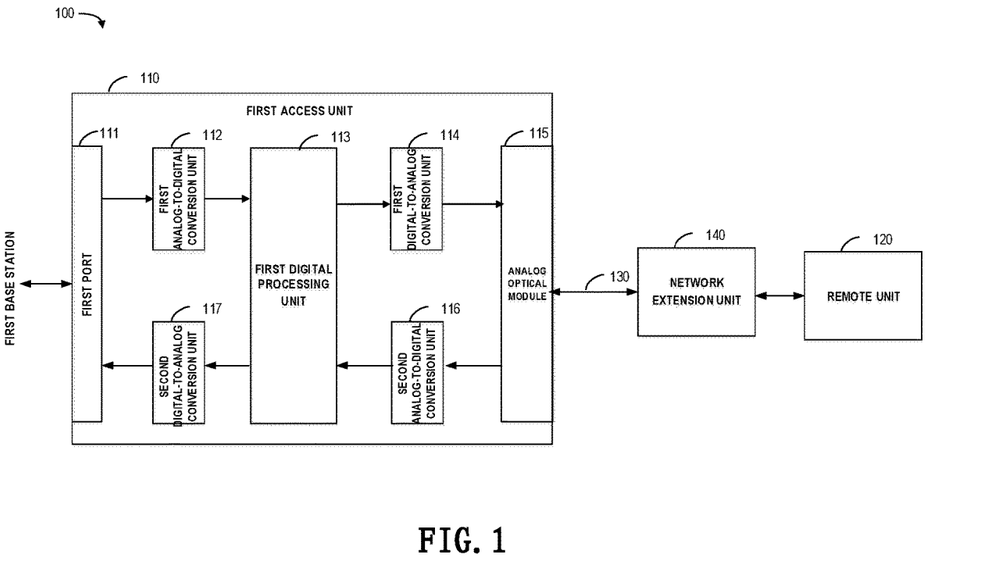
FIG. 1 is a schematic diagram of a distributed antenna system 100 according to a first embodiment of the present disclosure.

FIG. 1 is a schematic diagram of a distributed antenna system 100 according to a first embodiment of the present disclosure. As shown in FIG. 1, the distributed antenna system 100 comprises a first access unit/circuit 110 and a remote unit/circuit 120. The first access unit 110 and the remote unit 120 are coupled via an analog optical fiber 130.

Regarding the first access unit 110, it may include a first port/port circuit 111, a first analog-to-digital conversion unit/circuit 112, a first digital processing unit/circuit 113, a first digital-to-analog conversion unit/circuit 114 and an analog optical module/circuit 115.

The first port 111 may be used to receive a first downlink analog radio frequency signal from a first base station (not shown).

The first analog-to-digital conversion unit 112 is coupled to the first port 111. The first analog-to-digital conversion unit 112 may be configured to perform analog-to-digital conversion on the first downlink analog radio frequency signal to generate a first downlink digital signal.

The first digital processing unit 113 is coupled to the first analog-to-digital conversion unit 112. The first digital processing unit 113 may be configured to perform digital signal processing on the first downlink digital signal to generate a second downlink digital signal. The first digital processing unit can be implemented by for example a Field Programmable Gate Array FPGA, a Digital Signal Processor DSP, etc. The digital signal processing for example may include, but is not limited to, digital filtering, digital power balancing, TDD synchronization tracking, and digital power statistics.

The first digital-to-analog conversion unit 114 is coupled to the first digital processing unit 113. The first digital-to-analog conversion unit 114 may be configured to perform digital-to-analog conversion on the second downlink digital signal to generate a second downlink analog radio frequency signal.

The analog optical module 115 is coupled to the first digital-to-analog conversion unit 114. The analog optical module 115 may be configured to perform electro-optical conversion on the second downlink analog radio frequency signal to generate a first downlink analog optical signal which is transmitted to the remote unit 120 via the analog optical fiber 130.

The remote unit 120 may be configured to perform photoelectric conversion on the first downlink analog optical signal to generate a downlink analog radio frequency signal for transmission. For example, the remote unit 120 may include an analog optical module for performing photoelectric conversion on the first downlink analog optical signal to generate a downlink analog radio frequency signal. The remote unit 120 may be coupled to an antenna to transmit the downlink analog radio frequency signal via the antenna.

Therefore, the access unit performs analog-to-digital conversion, digital processing, digital-to-analog conversion, and electro-optical conversion on the downlink analog radio frequency signal, and then transmits the converted signal to the remote unit through the analog optical fiber, so that the large-bandwidth data transmission of the downlink signal is achieved through the analog optical fiber. In addition, using the analog optical fiber for remote transmission may facilitate sharing and co-construction to save the transmission cost.

In some embodiments, the remote unit 120 may receive an uplink analog radio frequency signal via an antenna, and perform electro-optical conversion on the uplink analog radio frequency signal to generate an uplink analog optical signal. The analog optical module 115 may be configured to receive the uplink analog optical signal from the remote unit 120 and convert the uplink analog optical signal into a first uplink analog radio frequency signal.

As shown in FIG. 1, the first access unit 110 may further include a second analog-to-digital conversion unit/circuit 116 and a second digital-to-analog conversion unit/circuit 117.

The second analog-to-digital conversion unit 116 is coupled to the analog optical module 115. The second analog-to-digital conversion unit 116 may be configured to perform analog-to-digital conversion on the first uplink analog radio frequency signal to generate a first uplink digital signal.

The first digital processing unit 113 may also be coupled to the second analog-to-digital conversion unit 116. The first digital processing unit 113 may also be configured to perform digital signal processing on the first uplink digital signal to generate a second uplink digital signal.

The second digital-to-analog conversion unit 117 is coupled to the first digital processing unit 113 and the first port 111. The second digital-to-analog conversion unit 117 may be configured to perform digital-to-analog conversion on the second uplink digital signal to generate a second uplink analog radio frequency signal which will be transmitted to the first base station via the first port 111.

In some embodiments, the first analog-to-digital conversion unit 112 and the second digital-to-analog conversion unit 117 are coupled to the first port 111 via a duplexer (not shown). The duplexer is used to receive the second uplink analog radio frequency signal from the second digital-to-analog conversion unit 117 and transmit it to the first port 111. The duplexer is further configured to receive the first downlink analog radio frequency signal from the first port 111 and transmit the first downlink analog radio frequency signal to the first analog-to-digital conversion unit 112. In other embodiments, the first analog-to-digital conversion unit 112 and the second digital-to-analog conversion unit 117 are coupled to the first port 111 via a radio frequency switch circuit (not shown). Upon receiving the second uplink analog radio frequency signal, the radio frequency switch circuit is configured to connect the first port 111 with the second digital-to-analog conversion unit 117, to transmit the second uplink analog radio frequency signal from the second digital-to-analog conversion unit 117 to the first port 111. The radio frequency switch circuit is further configured to connect the first port 111 with the first analog-to-digital conversion unit 112 upon sending the first downlink analog radio frequency signal, to transmit the first downlink analog radio frequency signal from the first port 111 to the first analog-to-digital conversion unit 112.

It should be understood that although the first analog-to-digital conversion unit and the second digital-to-analog conversion unit are shown as separate units, this is only an example, and the first analog-to-digital conversion unit and the second digital-to-analog conversion unit can also be integrated as a first analog-to-digital/digital-to-analog conversion unit. Similarly, although the second analog-to-digital conversion unit and the second digital-to-analog conversion unit are shown as separate units herein, this is only an example, and the second analog-to-digital conversion unit and the second digital-to-analog conversion unit may be integrated as a second analog-to-digital/digital-to-analog conversion unit.

In this way, the access unit performs photoelectric conversion, analog-to-digital conversion, digital processing, and digital-to-analog conversion on the uplink analog optical signal received from the remote unit via the analog optical fiber, and then transmits it to the base station, so that large-bandwidth data transmission of the uplink signal can be realized through the analog optical fiber.

In some embodiments, the distributed antenna system 100 may further include a network extension unit/circuit 140 coupled between the first access unit 110 and the remote unit 120. The network extension unit 140 may be coupled to the first access unit 110 and the remote unit 120 through the analog optical fiber.

Therefore, prolonging and extension of the remote unit can be achieved through the network extension unit and the analog optical fiber, and coverage of the remote unit to a remoter and deeper degree can be realized.

Figure 2:
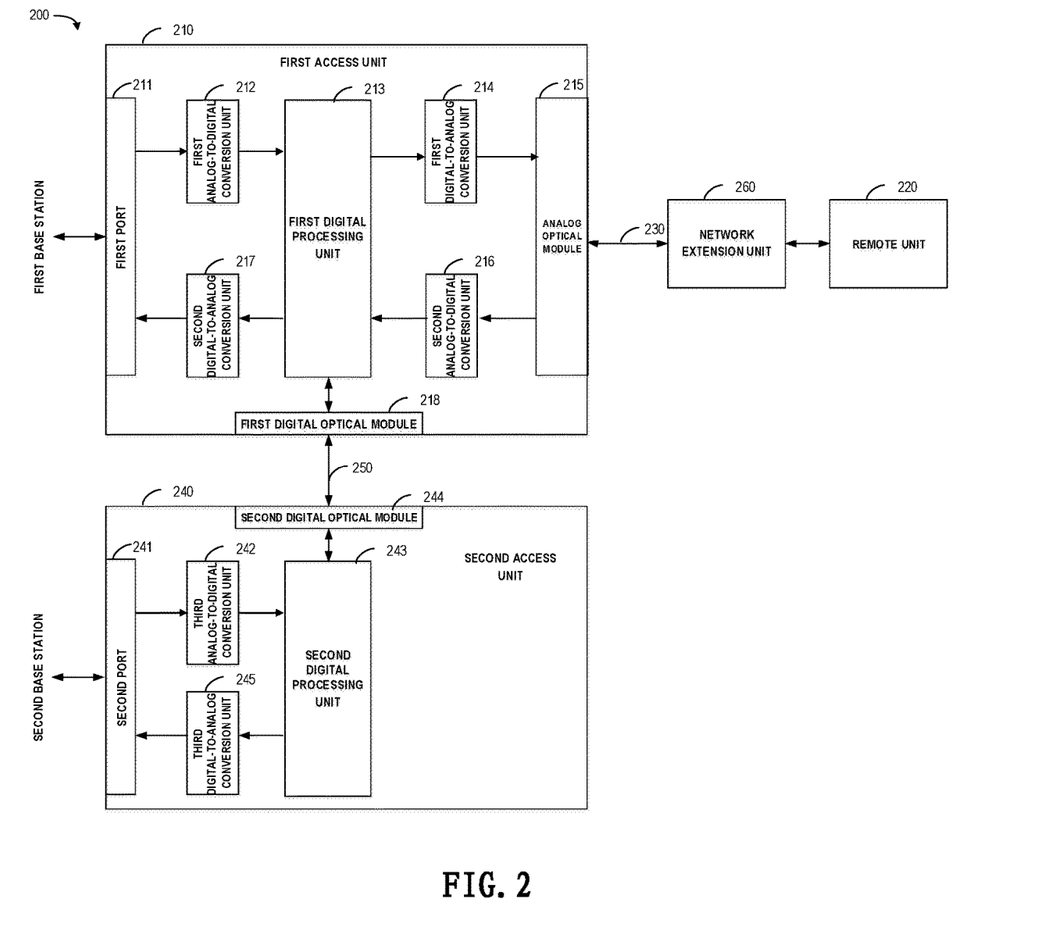
FIG. 2 is a schematic diagram of a distributed antenna system 200 according to a second embodiment of the present disclosure.

FIG. 2 is a schematic diagram of a distributed antenna system 200 according to a second embodiment of the present disclosure. As shown in FIG. 2, a distributed antenna system 200 comprises a first access unit/circuit 210, a remote unit/circuit 220 and a second access unit/circuit 240. The first access unit 210 and the remote unit 220 are coupled via an analog optical fiber 230. The first access unit 210 and the second access unit 240 are coupled via a digital optical fiber 250.

Regarding the first access unit 210, it may include a first port/port circuit 211, a first analog-to-digital conversion unit/circuit 212, a first digital processing unit/circuit 213, a first digital-to-analog conversion unit/circuit 214, an analog optical module/circuit 215, a second analog-to-digital conversion unit/circuit 216, a second digital-to-analog conversion unit/circuit 217 and a first digital optical module/circuit 218. The connectional relationship between and functions of the first port 211, the first analog-to-digital conversion unit 212, the first digital processing unit 213, the first digital-to-analog conversion unit 214, the analog optical module 215, the second analog-to-digital conversion unit 216 and the second digital-to-analog conversion unit 217 are similar to those in FIG. 1, and can be known from the preceding text and will not be repeated here any more. The first digital optical module 218 is coupled to the first digital processing unit 213.

Regarding the second access unit 240, it may include a second port/port circuit 241, a third analog-to-digital conversion unit/circuit 242, a second digital processing unit/circuit 243 and a second digital optical module/circuit 244.

The second port 241 may be used to receive a third downlink analog radio frequency signal from the second base station.

The third analog-to-digital conversion unit 242 is coupled to the second port 241. The third analog-to-digital conversion unit 242 may be configured to perform analog-to-digital conversion on the third downlink analog radio frequency signal to generate a third downlink digital signal.

The second digital processing unit 243 is coupled to the third analog-to-digital conversion unit 242. The second digital processing unit 243 may be configured to perform digital signal processing on the third downlink digital signal to generate a fourth downlink digital signal.

The second digital optical module 244 is coupled to the second digital processing unit 243. The second digital optical module 244 is also coupled to the first digital optical module 218 via the digital optical fiber 250. The second digital optical module 244 may be configured to perform electro-optical conversion on the fourth downlink digital signal to generate a downlink digital optical signal which is transmitted to the first digital optical module 218 via the digital optical fiber 250.

The first digital optical module 218 may be configured to perform photoelectric conversion on the downlink digital optical signal to generate a fifth downlink digital signal.

The first digital processing unit 213 may also be configured to perform digital signal processing on the first downlink digital signal and the fifth downlink digital signal to generate a second downlink digital signal.

Therefore, the coupling between the first access unit and the second access unit can be achieved through the digital optical fiber, the first access unit may serve as a master access unit, and the second access unit may serve as a slave access unit, the number of coupled base stations may be increased, and the second access unit performs analog-to-digital conversion, digital processing and electro-optical conversion on the downlink analog radio frequency signal from the second base station, and then transmits the signal to the first access unit through digital optical fiber, performs digital processing on the signal together with the downlink digital signal after conversion of the downlink analog radio frequency signal from the first base station, and then transmits the signal after the digital processing to the remote unit, thereby achieving the extension and prolonging of the source of the downlink signal.

In some embodiments, the first digital optical module 218 may further be configured to perform electro-optical conversion of the second uplink digital signal to generate an uplink digital optical signal.

The second digital optical module 244 may also be used to perform photoelectric conversion on the uplink digital optical signal to generate a third uplink digital signal.

The second digital processing unit 243 may also be configured to perform digital signal processing on the third uplink digital signal to generate a fourth uplink digital signal.

The second access unit 240 may further include a third digital-to-analog conversion unit/circuit 245. The third digital-to-analog conversion unit 245 is coupled to the second digital processing unit 243. The third digital-to-analog conversion unit 245 may be configured to perform digital-to-analog conversion on the fourth uplink digital signal to generate a third uplink analog radio frequency signal which is transmitted to the second base station via the second port 241.

It should be appreciated that although the third analog-to-digital conversion unit and the third digital-to-analog conversion unit are shown as separate units herein, this is only an example, and the third analog-to-digital conversion unit and the third digital-to-analog conversion unit may also be integrated as a third analog-to-digital/digital-to-analog conversion unit.

Therefore, the coupling between the first access unit and the second access unit can be achieved through the digital optical fiber, the first access unit may serve as a master access unit, the second access unit may serve as a slave access unit, the number of coupled base stations may be enlarged, and the first access unit performs electro-optical conversion on the uplink digital signal, and then transmits it to the second access unit through a digital optical fiber for digital processing and digital-to-analog conversion, and then transmits it to the second base station, thereby achieving receiver extension and receiver prolonging of the uplink signal.

In some embodiments, the distributed antenna system 200 may further include a network extension unit 260 coupled between the first access unit 210 and the remote unit 220. The network extension unit 260 may be coupled with the first access unit 210 and the remote unit 220 through an analog optical fiber.

Therefore, further prolonging and extension of the remote unit can be achieved through the network extension unit and the analog optical fiber, and coverage of the remote unit to a remoter and deeper degree can be realized.

Figure 3:
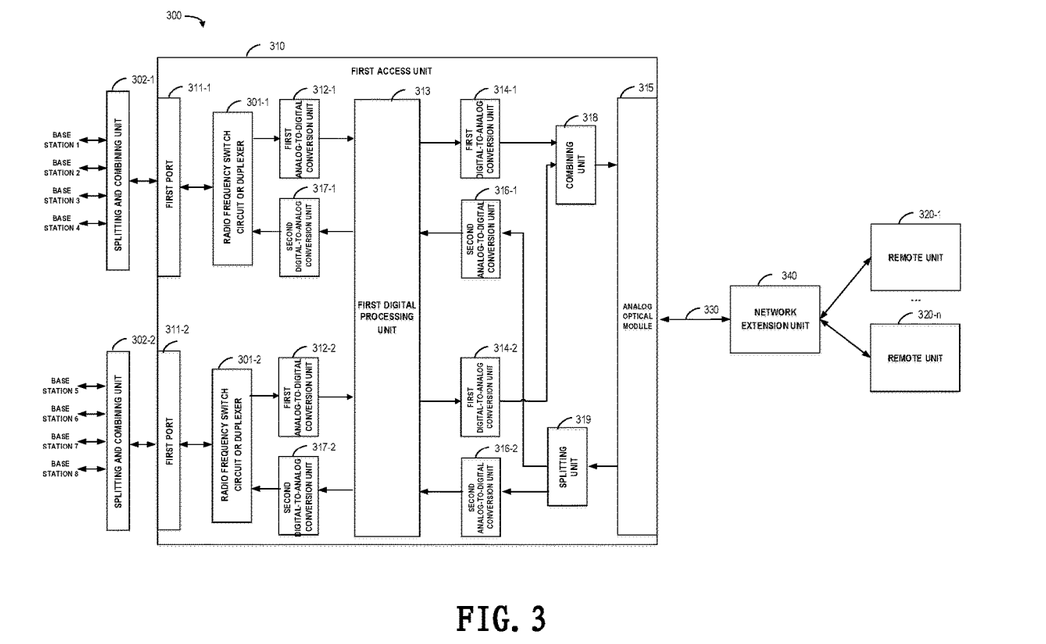
FIG. 3 is a schematic diagram of a distributed antenna system 300 according to a third embodiment of the present disclosure.

FIG. 3 is a schematic diagram of a distributed antenna system 300 according to a third embodiment of the present disclosure. As shown in FIG. 3, the distributed antenna system 300 comprises a first access unit 310, a plurality of remote units 320-1 to 320-*n* (collectively referred to as 320) and a network extension unit 340. The first access unit 310, the plurality of remote units 320 and the network extension unit 340 are coupled via an analog optical fiber 330, and the network extension unit 340 is coupled between the first access unit 310 and the plurality of remote units 320. It should be appreciated that although one network extension unit 340 is shown in FIG. 3, this is only an example, and the number of network extension units may be plural.

In some embodiments, as shown in FIG. 3, the distributed antenna system 300 further comprises two splitting and combining units/circuits 302-1 and 302-2 (the splitting and combining units are collectively referred to as 302). It should be appreciated that although FIG. 3 shows two splitting and combining units, this is only an example, and there may be more splitting and combining units.

As shown in FIG. 3, the first access unit 310 comprises two first ports 311-1 and 311-2 (the first ports are collectively referred to as 311 hereinafter).

Each splitting and combining unit 302 is coupled between four first base stations (base stations 1-4, or base stations 5-8) and the corresponding first ports 311. As shown in FIG. 3, the splitting and combining unit 302-1 is coupled between the four first base stations (base stations 1-4) and the corresponding first ports 311-1, and the splitting and combining unit 302-2 is coupled between the four first base stations (base stations 5-8) and the corresponding first ports 311-2. It should be appreciated that although FIG. 3 shows that each splitting and combining unit is coupled to four first base stations, this is only an example, and each splitting and combining unit may also be coupled to other numbers of first base stations.

Each splitting and combining unit 302 is configured to combine a plurality of downlink analog radio frequency signals with the same frequency band from a plurality of first base stations to generate a first downlink analog radio frequency signal to output the first downlink analog radio frequency signal to the corresponding first port 311. Each splitting and combining unit 302 is further configured to split the second uplink analog radio frequency signal from the corresponding first port 311 to output to the plurality of first base stations.

In this way, combination processing can be performed on the downlink analog radio frequency signals having the same frequency band from the plurality of first base stations, thereby improving the efficiency.

The two first ports 311 are used to receive two first downlink analog radio frequency signals from the two splitting and combining units 302 respectively. It should be appreciated that although FIG. 3 shows the numbers of first ports (311-1 and 311-2), first downlink analog radio frequency signals, second downlink analog radio frequency signals, first analog-to-digital conversion units (312-1 and 312-2)), first digital-to-analog conversion units (314-1 and 314-2), second analog-to-digital conversion units (316-1 and 316-2) and second digital-to-analog conversion units (317-1 and 317-2) are all two, this is just an example, the numbers of first ports, the first downlink analog radio frequency signals, the second downlink analog radio frequency signals, the first analog-to-digital conversion units, the first digital-to-analog conversion units, the second analog-to-digital conversion units and the second digital-to-analog conversion units may be more than two, and the scope of the present disclosure is not limited herein.

The first analog-to-digital conversion units 312-1 and 312-2, the first digital processing unit 313, the first digital-to-analog conversion units 314-1 and 314-2, the analog optical module 315, the second analog-to-digital conversion units 316-1 and 316-2 and the second digital-to-analog conversion units 317-1 and 317-2 included in the first access unit 310 are similar to those in FIG. 1, which can be known from the preceding text and will not be repeated here anymore.

In some embodiments, as shown in FIG. 3, the first access unit 310 further comprises a combining unit/circuit 318. The combining unit 318 is coupled between the two first digital-to-analog conversion units 314-1 and 314-2 and the analog optical module 315. The combining unit 318 is configured to combine the two second downlink analog radio frequency signals to generate a combined downlink analog radio frequency signal. The analog optical module 315 is further configured to perform electro-optical conversion on the combined downlink analog radio frequency signal to generate a first downlink analog optical signal to be transmitted to the remote unit 320 via the analog optical fiber 330.

In some embodiments, as shown in FIG. 3, the first access unit 310 further comprises a splitting unit/circuit 319. The splitting unit 319 is coupled between the two second analog-to-digital conversion units 316-1 and 316-2 and the analog optical module 315. The splitting unit 319 is configured to split the first uplink analog radio frequency signal from the analog optical module 315 to generate two split uplink analog radio frequency signals. The two second analog-to-digital conversion units 316-1 and 316-2 are configured to perform analog-to-digital conversion on the two split uplink analog radio frequency signals to generate two first uplink digital signals. It should be appreciated that the two split uplink analog radio frequency signals and the two first uplink digital signals are only examples, and the number thereof may be plural.

It should be appreciated that although the combining unit and the splitting unit are shown as two separate units herein, this is only an example, and the combining unit and the splitting unit may also be integrated as a splitting and combining unit.

In some embodiments, the first analog-to-digital conversion unit 312-1 and the second digital-to-analog conversion unit 317-1 are coupled to the first port 311-1 via a duplexer or radio frequency switch circuit 301-1. The duplexer is configured to receive the second uplink analog radio frequency signal from the second digital-to-analog conversion unit 317-1, and transmitting it to the first port 311-1. The duplexer is further configured to receive the first downlink analog radio frequency signal from the first port 311-1 and transmit it to the first analog-to-digital conversion unit 312-1. The radio frequency switch circuit is used to connect the first port 311-1 with the second digital-to-analog conversion unit 317-1 when receiving the second uplink analog radio frequency signal, to transmit the second uplink analog signal from the second digital-to-analog conversion unit 317-1 to the first port 311-1.

The radio frequency switch circuit is further configured to connect the first port 311-1 with the first analog-to-digital conversion unit 312-1 when sending the first downlink analog radio frequency signal, to transmit the first downlink analog radio frequency signal from the first port 311-1 to the first analog-to-digital conversion unit 312-1. The first analog-to-digital conversion unit 312-2, the second digital-to-analog conversion unit 317-2, the duplexer or radio frequency switch circuit 301-2, and the first port 311-2 are also similar, and will not be described again.

In some embodiments, a radio frequency analog amplifier circuit for amplifying the first downlink analog radio frequency signal may be provided between the radio frequency switch circuit or duplexer 301-1 and the first analog-to-digital conversion unit 312-1. Similarly, an analog radio frequency amplifier circuit may also be provided between the radio frequency switch circuit or duplexer 301-2 and the first analog-to-digital conversion unit 312-2. A radio frequency analog amplifying circuit may for amplifying the second downlink analog radio frequency signal also be disposed between the first digital-to-analog conversion unit 314-1 and the combining unit 318. Similarly, a radio frequency analog amplifying circuit may also be disposed between the first digital-to-analog conversion unit 314-2 and the combining unit 318.

In addition, a radio frequency analog amplifying circuit for amplifying the second uplink analog radio frequency signal may be disposed between the radio frequency switch circuit or duplexer 301-1 and the second digital-to-analog conversion unit 317-1. Similarly, a radio frequency analog amplifying circuit may be disposed between the radio frequency switch circuit or duplexer 301-2 and the second digital-to-analog conversion unit 317-2. A radio frequency analog amplifying circuit for amplifying the first uplink analog radio frequency signal may also be disposed between the second analog-to-digital conversion unit 316-1 and the splitting unit 319. Similarly, a radio frequency analog amplifying circuit may also be disposed between the second analog-to-digital conversion unit 316-2 and the splitting unit 319.

It should be appreciated that although the first analog-to-digital conversion unit and the second digital-to-analog conversion unit are shown as separate units, this is only an example, and the first analog-to-digital conversion unit and the second digital-to-analog conversion unit may also be integrated as a first analog-to-digital/digital-to-analog conversion unit. For example, the first analog-to-digital conversion unit 312-1 and the second digital-to-analog conversion unit 317-1 may be integrated as one analog-to-digital/digital-to-analog conversion unit, and the first analog-to-digital conversion unit 312-2 and the second digital-to-analog conversion unit 317-2 may be integrated as another analog-to-digital/digital-to-analog conversion unit. For another example, the first analog-to-digital conversion unit 312-1, the second digital-to-analog conversion unit 317-1, the first analog-to-digital conversion unit 312-2 and the second digital-to-analog conversion unit 317-2 may be integrated as one analog-to-digital/digital-to-analog conversion unit.

Similarly, the second analog-to-digital conversion units 316-1 and 316-2 and the first digital-to-analog conversion units 314-1 and 314-2 are also in the same case, which will not be repeated.

In some embodiments, a plurality of first downlink analog radio frequency signals may have at least one of the following: one or more network standards, one or more network frequency bands, and one or more service types. For example, the two first downlink analog radio frequency signals may involve same-frequency same-standard multi-services, multi-frequency same-standard multi-services, same-frequency multi-standard multi-services, multi-frequency multi-standard multi-services etc. It should be understood that illustration is presented only by way of the two first downlink analog radio frequency signals, and it is also the same with a plurality of downlink analog radio frequency signals.

In some embodiments, the first digital processing unit 113 may be configured to digitally filter the first downlink digital signal to generate the second downlink digital signal. As a result, interference between signals such as the same-frequency same-standard multi-service signals, multi-frequency same-standard multi-service signals, same-frequency multi-standard multi-service signals, multi-frequency multi-standard multi-service signals can be reduced.

Alternatively or additionally, the first digital processing unit 113 may be configured to perform digitalized power balance for the first downlink digital signal to generate the second downlink digital signal. Thereby, the amplitudes of different traffic signals can for example be balanced.

Therefore, further prolonging and extension of the remote unit can be achieved through the network extension unit and the analog optical fiber, and coverage of the remote unit to a remoter and deeper degree can be realized. The first access unit, the network extension unit and the remote unit can employ star-type networking applications, and the topology is flexible and supports 1T1R, 2T2R and 4T4R mixed network networking topology, which is convenient for the flexible application of the system network. In addition, the access of multi-base station signals can be achieved, joint access of multiple network standards, multiple network frequency bands and multi-type network services can be enabled, and digitalized signal processing is enabled, which facilitates the balance of signal coverage of various operators in the sharing and co-construction.

Figure 4:
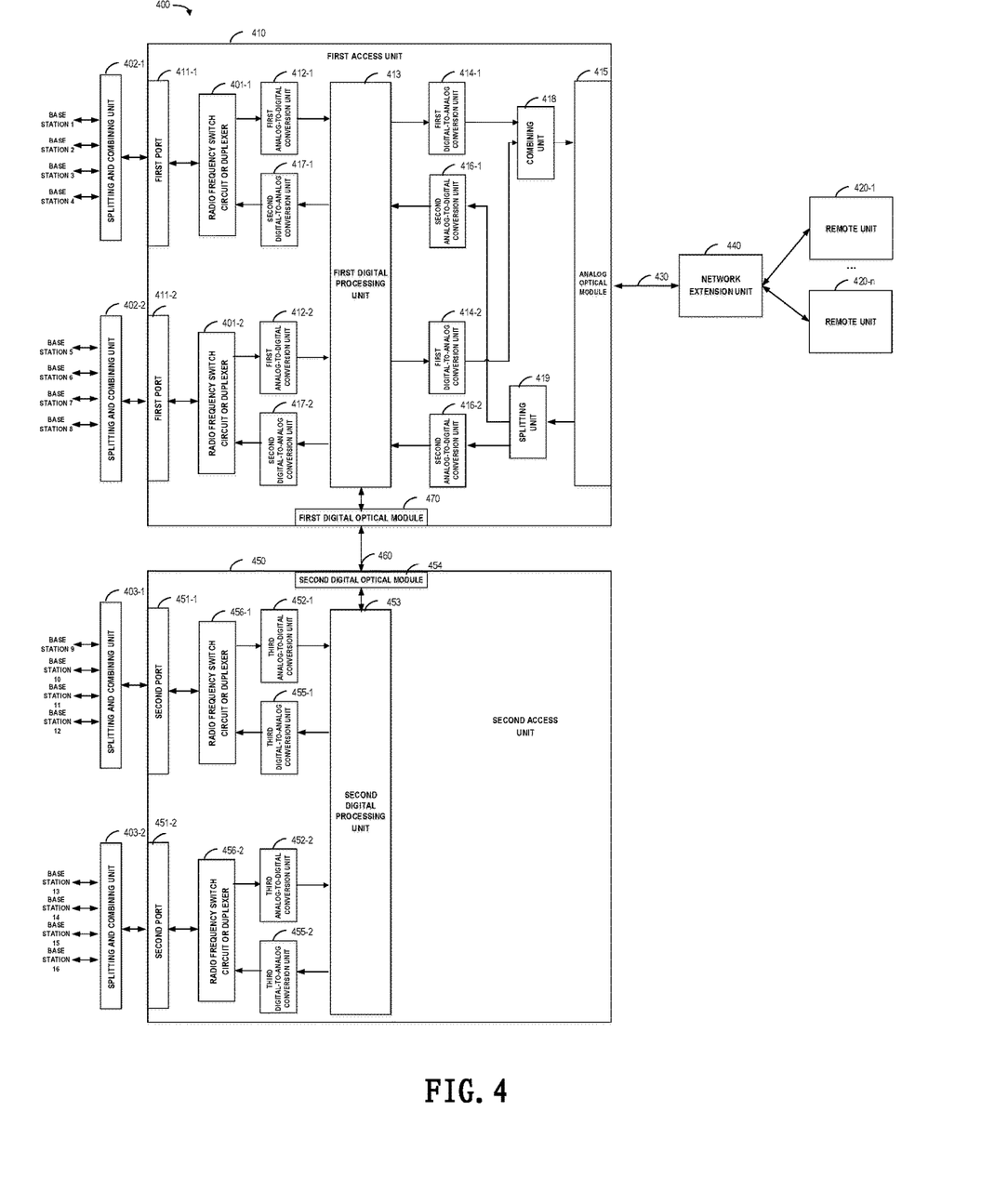
FIG. 4 is a schematic diagram of a distributed antenna system 400 according to a fourth embodiment of the present disclosure.

FIG. 4 is a schematic diagram of a distributed antenna system 400 according to a fourth embodiment of the present disclosure. As shown in FIG. 4, the distributed antenna system 400 comprises a first access unit 410, a plurality of remote units 420-1 to 420-n (collectively referred to as 420), a network extension unit 440 and a second access unit 450. The first access unit 410 and the second access unit 450 are coupled via a digital optical fiber 460. The first access unit 410, the plurality of remote units 420 and the network extension unit 440 are coupled via an analog optical fiber 430, and the network extension unit 440 is coupled between the first access unit 410 and the plurality of remote units 420. It should be appreciated that although one network extension unit 440 is shown in FIG. 4, this is only an example, and the number of network extension units may be plural.

Regarding the first access unit 410, it may include first ports 411-1 and 411-2, first analog-to-digital conversion units 412-1 and 412-2, a first digital processing unit 413, a first digital-to-analog conversion unit 414-1 and 412-2, an analog optical module 415, second analog-to-digital conversion units 416-1 and 416-2, second digital-to-analog conversion units 417-1 and 417-2, a combining unit 418, a splitting unit 419 and a first digital optical module 470. The connection relationship between and functions of first ports 411-1 and 411-2, the first analog-to-digital conversion units 412-1 and 412-2, the first digital processing unit 413, the first digital-to-analog conversion units 414-1 and 412-2, the analog optical module 415, the second analog-to-digital conversion units 416-1 and 416-2, the second digital-to-analog conversion units 417-1 and 417-2, the combining unit 418, the splitting unit 419 and the first digital optical module 470 are similar to those in FIG. 2 and FIG. 3, which can be known from the preceding text and will not be repeated here anymore.

In some embodiments, as shown in FIG. 4, the distributed antenna system 400 further comprises two splitting and combining units 403-1 and 403-2 (hereinafter collectively referred to as 403). It should be appreciated that although FIG. 4 shows two splitting and combining units, this is only an example, and there may be more splitting and combining units.

As shown in FIG. 4, the second access unit 450 may include two second ports 451-1 and 451-2 (hereinafter collectively referred to as 451), the third analog-to-digital conversion unit 452-1 and 452-2, the third digital-to-analog conversion unit 455-1 and 455-2, a second digital processing unit 453 and second digital optical module 454, the connection relationship of which is similar to those in FIG. 2, which can be known from the preceding text and will not be repeated here anymore.

Each splitting and combining unit 403 is coupled between four second base stations (base station 9, base station 10, base station 11, base station 12, or base station 13, base station 14, base station 15, base station 16) and the corresponding second port 451. As shown in FIG. 4, the splitting and combining unit 403-1 is coupled between the four second base stations (base stations 9-12) and the corresponding second ports 451-1, and the splitting and combining unit 403-2 is coupled between the four second base stations (base stations 13-16) and the corresponding second ports 451-2. It should be appreciated that although FIG. 4 shows that each splitting and combining unit 403 is coupled to four first base stations, this is only an example, and each splitting and combining unit 403 may also be coupled to other numbers of first base stations.

Each splitting and combining unit 403 is configured to combine a plurality of downlink analog radio frequency signals with the same frequency band from a plurality of second base stations to generate a third downlink analog radio frequency signal to output to a corresponding second port 451. Each splitting and combining unit 403 is further configured to split the third uplink analog radio frequency signal from the corresponding second port 451 to output to a plurality of second base stations. In this way, combination processing is performed on the downlink analog radio frequency signals having the same frequency band from the plurality of second base stations, thereby improving the efficiency.

In some embodiments, the two second ports 451 are used to receive two third downlink analog radio frequency signals from the two splitting and combining units 403 respectively. It should be understood that although FIG. 4 shows that the numbers of the first ports, the second ports, the third downlink analog radio frequency signals, the third analog-to-digital conversion units and the third digital-to-analog conversion unit are all two, this is only an example, the number of the first ports, the second ports and the third downlink analog radio frequency signals may be more than two, and the scope of the present disclosure is not limited herein.

In some embodiments, the third analog-to-digital conversion unit 452-1 and the third digital-to-analog conversion unit 455-1 are coupled to the second port 451-1 via a duplexer or radio frequency switch circuit 456-1. The duplexer is used to receive the third uplink analog radio frequency signal from the third digital-to-analog conversion unit 455-1, and transmit the signal to the second port 451-1. The duplexer is further configured to receive the third downlink analog radio frequency signal from the second port 451-1 and transmit the signal to the third analog-to-digital conversion unit 452-1. The radio frequency switch circuit is used to connect the second port 451-1 with the third digital-to-analog conversion unit 455-1 when receiving the third uplink analog radio frequency signal, to convert the third uplink analog radio frequency signal from the third digital-to-analog conversion unit 455-1. The radio frequency switch circuit is also used to connect the second port 451-1 with the third analog-to-digital conversion unit 452-1 when sending the third downlink analog radio frequency signal, to transmit the third downlink analog radio frequency signal from the second port 451-1 to the third analog-to-digital conversion unit 452-1. The third analog-to-digital conversion unit 452-2, the third digital-to-analog conversion unit 455-2, the duplexer or radio frequency switch circuit 456-2, and the second port 451-2 are also similar, and will not be repeated here.

In some embodiments, a radio frequency analog amplifying circuit may be provided between the radio frequency switch circuit or duplexer 456-1 and the third analog-to-digital conversion unit 452-1, to amplify the third downlink analog radio frequency signal. Similarly, an analog radio frequency amplifying circuit may also be provided between the radio frequency switch circuit or duplexer 456-2 and the third analog-to-digital conversion unit 452-2.

In addition, a radio frequency analog amplifying circuit may be provided between the radio frequency switch circuit or duplexer 456-1 and the third digital-to-analog conversion unit 455-1 and configured to amplify the third uplink analog radio frequency signal. Similarly, a radio frequency analog amplifying circuit may be provided between the radio frequency switch circuit or duplexer 456-2 and the third digital-to-analog conversion unit 455-2.

It should be appreciated that although the third analog-to-digital conversion unit and the third digital-to-analog conversion unit are shown as separate units herein, this is only an example, and the third analog-to-digital conversion unit and the third digital-to-analog conversion unit may also be integrated as analog-to-digital/digital-to-analog conversion unit. For example, the third analog-to-digital conversion unit 452-1 and the third digital-to-analog conversion unit 455-1 may be integrated as one analog-to-digital/digital-to-analog conversion unit, and the third analog-to-digital conversion unit 452-2 and the third digital-to-analog conversion unit 455-2 may be integrated as another analog-to-digital/digital-to-analog conversion unit. Furthermore, the third analog-to-digital conversion unit 452-1, the third digital-to-analog conversion unit 455-1, the third analog-to-digital conversion unit 452-2 and the third digital-to-analog conversion unit 455-2 may be integrated as one analog-to-digital/digital-to-analog conversion unit.

Therefore, the coupling between the first access unit and the second access unit may be achieved through a digital optical fiber, the first access unit may serve as a master access unit, and the second access unit may serve as a slave access unit, and the number of coupled base stations may be increased, thereby achieving source extension and source prolonging of the downlink signal and the receiver extension and receiver prolonging of the uplink signal.

In addition, further prolonging and extension of the remote unit can be achieved through the network extension unit and the analog optical fiber, and coverage of the remote unit to a remoter and deeper degree can be realized. The first access unit, the network extension unit and the remote unit may employ star-type networking applications, and the topology is flexible and supports 1T1R, 2T2R and 4T4R mixed network networking topology, which is convenient for the flexible application of the system network. In addition, the access of multi-base station signals can be achieved, joint access of multiple network standards, multiple network frequency bands and multi-type network services can be enabled, and digitalized signal processing is enabled, which facilitates the balance of signal coverage of various operators in the sharing and co-construction.

Figure 5:
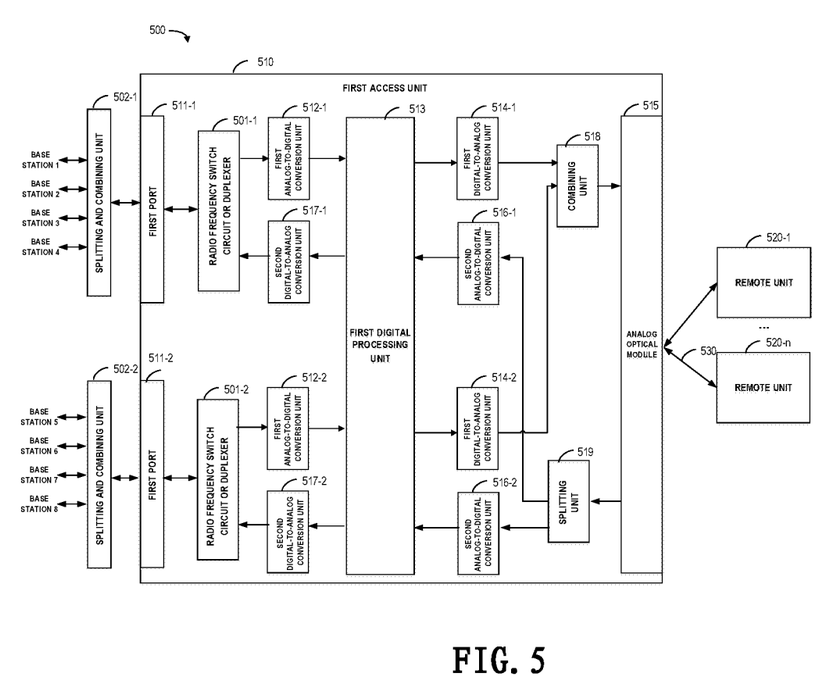
FIG. 5 is a schematic diagram of a distributed antenna system 500 according to a fifth embodiment of the present disclosure.

FIG. 5 shows a schematic diagram of a distributed antenna system 500 according to a fifth embodiment of the present disclosure. As shown in FIG. 5, except that the distributed antenna system 500 does not include a network extension unit, a first access unit 510, remote units 520-1 to 520-n, an analog optical fiber 530, radio frequency switch circuits or duplexers 501-1 and 501-2, splitting and combining units 502-1 and 502-2, first ports 511-1 and 511-2, first analog-to-digital conversion units 512-1 and 512-2, a first digital processing unit 513, first digital-to-analog conversion units 514-1 and 514-2, an analog optical module 515, second analog-to-digital conversion units 516-1 and 516-2, and second digital-to-analog conversion unit 517-1 and 517-2, a combining unit 518 and a splitting unit 519 included by the distributed antenna system 500 are similar to those in FIG. 3, and may be known from the preceding text and will not be repeated any more here.

Figure 6:
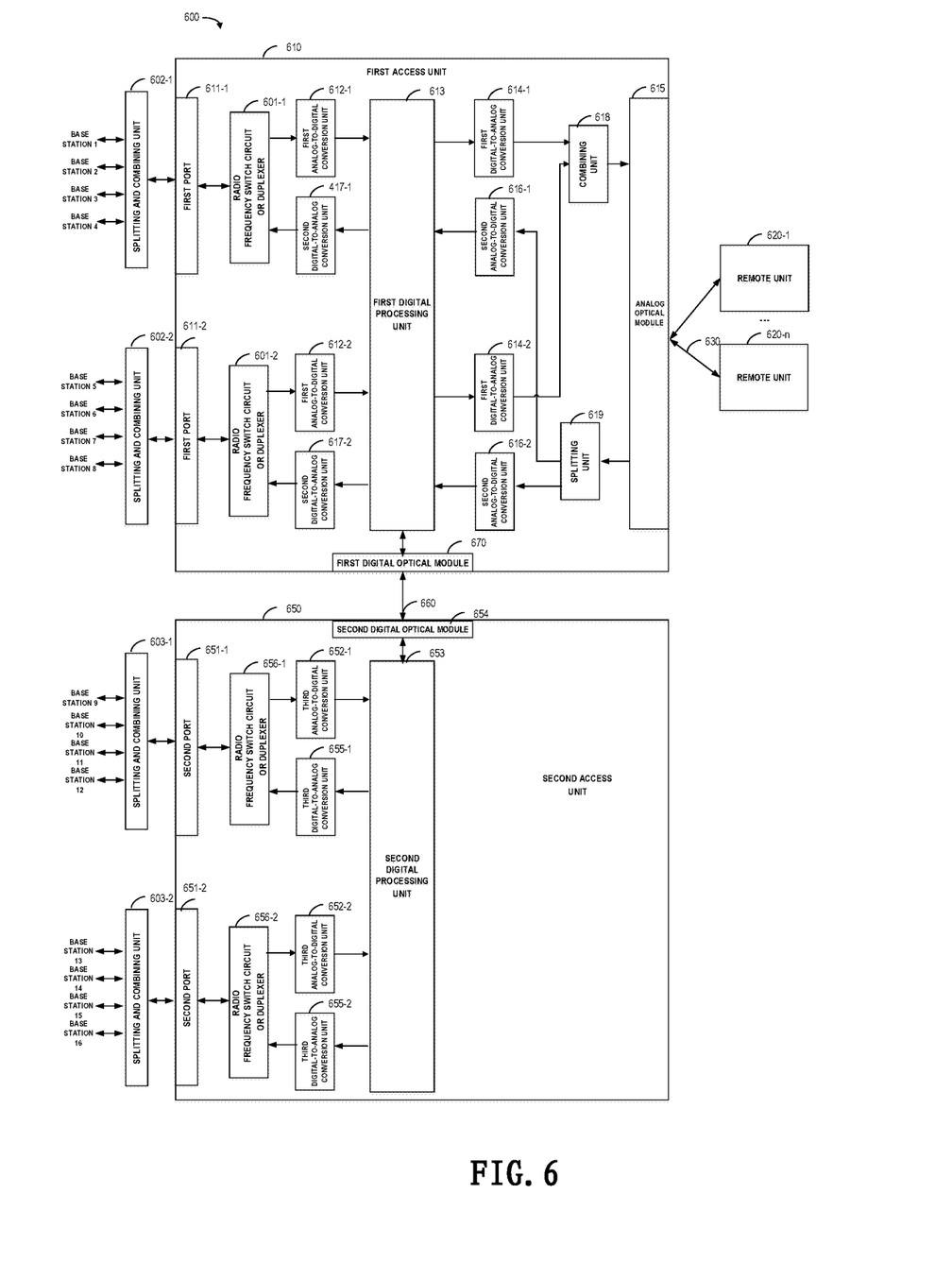
FIG. 6 is a schematic diagram of a distributed antenna system 600 according to a sixth embodiment of the present disclosure.

FIG. 6 shows a schematic diagram of a distributed antenna system 600 according to a sixth embodiment of the present disclosure. As shown in FIG. 6, except that the distributed antenna system 600 does not include a network extension unit, a first access unit 610, remote units 620-1 to 620-n, an analog optical fiber 630, radio frequency switch circuits or duplexers 601-1 and 601-2, splitting and combining units 602-1 and 602-2, first ports 611-1 and 611-2, first analog-to-digital conversion units 612-1 and 612-2, a first digital processing unit 613, first digital-to-analog conversion units 614-1 and 614-2, an analog optical module 615, second analog-to-digital conversion units 616-1 and 616-2, second digital-to-analog conversion unit 617-1 and 617-2, a combining unit 618, a splitting unit 619, a second access unit 650, a first digital optical module 670, a second digital optical module 654, splitting and combining units 603-1 and 603-2, second ports 651-1 and 651-2, radio frequency switch circuits or duplexers 656-1 and 656-2, third analog-to-digital conversion units 652-1 and 652-2, a second digital processing unit 653 and third digital-to-analog conversion units 655-1 and 655-2 are similar to those in FIG. 4, and may be known from the preceding text and will not be repeated any more here.

Embodiments of the present disclosure further provide a communication system comprising: one or more base stations; and the distributed antenna system according to embodiments of the present disclosure, the distributed antenna system coupled to the one or more base stations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

We claim:

1. A distributed antenna system, comprising: a first access unit and a remote unit, wherein the first access unit and the remote unit are coupled to each other via an analog optical fiber, and the first access unit comprises:
   a first port configured to receive a first downlink analog radio frequency signal from a first base station;
   a first analog-to-digital conversion unit coupled to the first port and configured to perform analog-to-digital conversion on the first downlink analog radio frequency signal to generate a first downlink digital signal;
   a first digital optical module configured to perform photoelectric conversion on a downlink digital optical signal to generate an additional downlink digital signal;
   a first digital processing unit coupled to the first analog-to-digital conversion unit and coupled to the first digital optical module, and configured to perform digital signal processing on the first downlink digital signal and the additional downlink digital signal to generate a second downlink digital signal;
   a first digital-to-analog conversion unit coupled to the first digital processing unit and configured to perform digital-to-analog conversion on the second downlink digital signal to generate a second downlink analog radio frequency signal; and
   an analog optical module coupled to the first digital-to-analog conversion unit and configured to perform electro-optical conversion on the second downlink analog radio frequency signal to generate a first downlink analog optical signal which is transmitted to the remote unit via the analog optical fiber.

2. The distributed antenna system according to claim 1, wherein the analog optical module is further configured to receive an uplink analog optical signal from the remote unit, and convert the uplink analog optical signal into a first uplink analog radio frequency signal, and the first access unit further comprises:
   a second analog-to-digital conversion unit coupled to the analog optical module and configured to perform analog-to-digital conversion on the first uplink analog radio frequency signal to generate a first uplink digital signal;
   the first digital processing unit further coupled to the second analog-to-digital conversion unit and further configured to perform digital signal processing on the first uplink digital signal to generate a second uplink digital signal; and
   a second digital-to-analog conversion unit coupled to the first digital processing unit and the first port and further configured to perform digital-to-analog conversion on the second uplink digital signal to generate a second uplink analog radio frequency signal which is transmitted to the first base station via the first port.

3. The distributed antenna system according to claim 2, wherein the distributed antenna system further comprises a second access unit, the second access unit comprises:

a second port configured to receive a third downlink analog radio frequency signal from a second base station;

a third analog-to-digital conversion unit coupled to the second port and configured to perform analog-digital conversion on the third downlink analog radio frequency signal to generate a third downlink digital signal;

a second digital processing unit coupled to the third analog-to-digital conversion unit and configured to perform digital signal processing on the third downlink digital signal to generate a fourth downlink digital signal;

a second digital optical module coupled to the second digital processing unit and coupled to the first digital optical module via a digital optical fiber and configured to perform electro-optical conversion on the fourth downlink digital signal to generate the downlink digital optical signal which is transmitted to the first digital optical module via the digital optical fiber.

4. The distributed antenna system according to claim 3, wherein the first digital optical module is further configured to perform electro-optical conversion on the second uplink digital signal to generate an uplink digital optical signal, the second digital optical module is further configured to perform photoelectric conversion on the uplink digital optical signal to generate a third uplink digital signal, the second digital processing unit is further configured to perform digital signal processing on the third uplink digital signal to generate a fourth uplink digital signal, and the second access unit further comprises:

a third digital-to-analog conversion unit coupled to the second digital processing unit and configured to perform digital-to-analog conversion on the fourth uplink digital signal to generate a third uplink analog radio frequency signal which is transmitted to the second base station via the second port.

5. The distributed antenna system according to claim 1, wherein there are a plurality of remote units, and the distributed antenna system further comprises a network extension unit coupled between the first access unit and the plurality of remote units via the analog optical fiber.

6. The distributed antenna system according to claim 2, wherein there are a plurality of remote units, and the distributed antenna system further comprises a network extension unit coupled between the first access unit and the plurality of remote units via the analog optical fiber.

7. The distributed antenna system according to claim 3, wherein there are a plurality of remote units, and the distributed antenna system further comprises a network extension unit coupled between the first access unit and the plurality of remote units via the analog optical fiber.

8. The distributed antenna system according to claim 4, wherein there are a plurality of remote units, and the distributed antenna system further comprises a network extension unit coupled between the first access unit and the plurality of remote units via the analog optical fiber.

9. The distributed antenna system according to claim 2, wherein there are a plurality of the first ports, a plurality of the first base stations, a plurality of the first downlink analog radio frequency signals, a plurality of the second downlink analog radio frequency signals, a plurality of the first analog-to-digital conversion units and a plurality of the first digital-to-analog conversion units, and the first access unit further comprises:

a combining unit coupled between the plurality of first digital-to-analog conversion units and the analog optical modules and configured to combine the plurality of second downlink analog radio frequency signals to generate a combined downlink analog radio frequency signal; and the analog optical module further configured to perform electro-optical conversion on the combined downlink analog radio frequency signal to generate the first downlink analog optical signal which is transmitted to the remote unit via the analog optical fiber.

10. The distributed antenna system according to claim 3, wherein there are a plurality of the first ports, a plurality of the first base stations, a plurality of the first downlink analog radio frequency signals, a plurality of the second downlink analog radio frequency signals, a plurality of the first analog-to-digital conversion units and a plurality of the first digital-to-analog conversion units, and the first access unit further comprises:

a combining unit coupled between the plurality of first digital-to-analog conversion units and the analog optical modules and configured to combine the plurality of second downlink analog radio frequency signals to generate a combined downlink analog radio frequency signal; and the analog optical module further configured to perform electro-optical conversion on the combined downlink analog radio frequency signal to generate the first downlink analog optical signal which is transmitted to the remote unit via the analog optical fiber.

11. The distributed antenna system according to claim wherein there are a plurality of the first ports, a plurality of the first base stations, a plurality of the first downlink analog radio frequency signals, a plurality of the second downlink analog radio frequency signals, a plurality of the first analog-to-digital conversion units and a plurality of the first digital-to-analog conversion units, and the first access unit further comprises:

a combining unit coupled between the plurality of first digital-to-analog conversion units and the analog optical modules and configured to combine the plurality of second downlink analog radio frequency signals to generate a combined downlink analog radio frequency signal; and the analog optical module further configured to perform electro-optical conversion on the combined downlink analog radio frequency signal to generate the first downlink analog optical signal which is transmitted to the remote unit via the analog optical fiber.

12. The distributed antenna system according to claim 4, wherein there are a plurality of the first ports, a plurality of the first base stations, a plurality of the first downlink analog radio frequency signals, a plurality of the second downlink analog radio frequency signals, a plurality of the first analog-to-digital conversion units and a plurality of the first digital-to-analog conversion units, and the first access unit further comprises:

a combining unit coupled between the plurality of first digital-to-analog conversion units and the analog optical modules and configured to combine the plurality of second downlink analog radio frequency signals to generate a combined downlink analog radio frequency signal; and the analog optical module further configured to perform electro-optical conversion on the combined downlink analog radio frequency signal to generate the first downlink analog optical signal which is transmitted to the remote unit via the analog optical fiber.

13. The distributed antenna system according to claim 9, wherein there are a plurality of second analog-to-digital conversion units and a plurality of second digital-to-analog conversion units, and the first access unit further comprises:
- a splitting unit coupled to the plurality of second analog-to-digital conversion units and the analog optical module and configured to split the first uplink analog radio frequency signal to generate a plurality of split uplink analog radio frequency signals; and
- the plurality of second analog-to-digital conversion units configured to perform analog-to-digital conversion on the plurality of split uplink analog radio frequency signals to generate a plurality of first uplink digital signals.

14. The distributed antenna system according to claim 13, wherein the distributed antenna system further comprises:
- a plurality of splitting and combining units, each of the plurality of splitting and combining units coupled between the plurality of first base stations and the corresponding first ports, each splitting and combining unit configured to combine a plurality of downlink analog radio frequency signals having the same frequency band from the plurality of first base stations to generate the first downlink analog radio frequency signal to output to the corresponding first port, and each of said splitting and combining units further configured to split the second uplink analog radio frequency signal from the corresponding first port to output to the plurality of first base stations.

15. The distributed antenna system according to claim 9, wherein the plurality of first downlink analog radio frequency signals have at least one of the following:
- one or more network standards, one or more network frequency bands, and one or more service types.

16. The distributed antenna system according to claim 15, wherein the first digital processing unit is further configured to perform at least one of digital filtering and digital power balancing performed on the first downlink digital signal and the additional downlink digital signal to generate the second downlink digital signal.

17. A communication system, wherein the communication system comprises:
- one or more base stations; and
- a distributed antenna system, comprising: a first access unit and a remote unit, wherein the first access unit and the remote unit are coupled to each other via an analog optical fiber, and the first access unit comprises:
- a first port configured to receive a first downlink analog radio frequency signal from a first base station;
- a first analog-to-digital conversion unit coupled to the first port and configured to perform analog-to-digital conversion on the first downlink analog radio frequency signal to generate a first downlink digital signal;
- a first digital optical module configured to perform photoelectric conversion on a downlink digital optical signal to generate an additional downlink digital signal;
- a first digital processing unit coupled to the first analog-to-digital conversion unit and coupled to the first digital optical module, and configured to perform digital signal processing on the first downlink digital signal and the additional downlink digital signal to generate a second downlink digital signal;
- a first digital-to-analog conversion unit coupled to the first digital processing unit and configured to perform digital-to-analog conversion on the second downlink digital signal to generate a second downlink analog radio frequency signal; and
- an analog optical module coupled to the first digital-to-analog conversion unit and configured to perform electro-optical conversion on the second downlink analog radio frequency signal to generate a first downlink analog optical signal which is transmitted to the remote unit via the analog optical fiber,
- the distributed antenna system being coupled to the one or more base stations.

18. The communication system according to claim 17, wherein there are a plurality of remote units, and the distributed antenna system further comprises a network extension unit coupled between the first access unit and the plurality of remote units via the analog optical fiber.

* * * * *